United States Patent
Aiello et al.

(10) Patent No.: US 10,982,555 B2
(45) Date of Patent: Apr. 20, 2021

(54) TANGENTIAL BLADE ROOT NECK CONIC

(71) Applicant: UNITED TECHNOLOGIES CORPORATION, Farmington, CT (US)

(72) Inventors: Nicholas Aiello, Middletown, CT (US); John C. Duong, East Hartford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 1420 days.

(21) Appl. No.: 14/787,013

(22) PCT Filed: Feb. 27, 2014

(86) PCT No.: PCT/US2014/019051
§ 371 (c)(1),
(2) Date: Oct. 26, 2015

(87) PCT Pub. No.: WO2014/186028
PCT Pub. Date: Nov. 20, 2014

(65) Prior Publication Data
US 2016/0076386 A1    Mar. 17, 2016

Related U.S. Application Data

(60) Provisional application No. 61/824,820, filed on May 17, 2013.

(51) Int. Cl.
*F01D 5/26* (2006.01)
*F01D 5/30* (2006.01)
(Continued)

(52) U.S. Cl.
CPC ............... *F01D 5/26* (2013.01); *F01D 5/141* (2013.01); *F01D 5/3007* (2013.01);
(Continued)

(58) Field of Classification Search
CPC ... F01D 5/22; F01D 5/225; F01D 5/26; F01D 5/16; F01D 5/20; F01D 5/186;
(Continued)

(56) References Cited

U.S. PATENT DOCUMENTS 2,809,801 A     10/1957  Curry
2,912,222 A  *  11/1959  Wilkes, Jr. ............ F01D 5/3038
                                              29/889.21
(Continued)

FOREIGN PATENT DOCUMENTS

EP    0277906 A2    8/1988
EP    2441921 A1    4/2012
GB    2265671 A    10/1993

OTHER PUBLICATIONS

International Search Report Application No. PCT/US2014/019051 dated Jun. 10, 2014.
(Continued)

*Primary Examiner* — Mark A Laurenzi
*Assistant Examiner* — Loren C Edwards
(74) *Attorney, Agent, or Firm* — Cantor Colburn LLP

(57) ABSTRACT

A root extending from a platform of an airfoil is disclosed. The root may include a first portion having a generally cylindrical shape, and a second portion extending from the first portion to the platform. The second portion may have a circumference larger than a circumference of the first portion.

17 Claims, 4 Drawing Sheets

(51) Int. Cl.
*F01D 5/14* (2006.01)
*F02C 3/04* (2006.01)
*F04D 29/32* (2006.01)

(52) U.S. Cl.
CPC .............. *F01D 5/3038* (2013.01); *F02C 3/04* (2013.01); *F04D 29/322* (2013.01); *F05D 2220/32* (2013.01); *F05D 2230/50* (2013.01); *F05D 2240/30* (2013.01); *F05D 2250/70* (2013.01)

(58) Field of Classification Search
CPC .......... F01D 5/187; F01D 5/141; F01D 5/143; F01D 5/147; F01D 5/30; F01D 5/3007; F01D 5/3038; F01D 11/08; F02C 3/04; F04D 29/322; F05D 2220/32; F05D 2230/50; F05D 2240/30; F05D 2250/70
USPC .......................................................... 60/805
See application file for complete search history.

(56) References Cited

U.S. PATENT DOCUMENTS

| | | |
|---|---|---|
| 3,867,069 A | 2/1975 | Bussel |
| 4,465,432 A | 8/1984 | Mandet et al. |
| 4,645,425 A | 2/1987 | Morrison, Jr. |
| 5,435,694 A | 7/1995 | Kray et al. |
| 2002/0106279 A1* | 8/2002 | Selby .................... F01D 5/3038 416/9 |
| 2008/0170942 A1 | 7/2008 | Aubin et al. |

OTHER PUBLICATIONS

Supplementary European Search Report for EP Application No. EP 14 79 7192.

EP Office Action for Applicaiton No. 14 797 192.3 dated Jul. 26, 2019.

Summons to attend oral proceedings for Application No. 14 797,192. 3; Dated: Oct. 8, 2020.

* cited by examiner

TANGENTIAL BLADE ROOT NECK CONIC

CROSS-REFERENCE TO RELATED APPLICATION

This Application is a US National Stage under 35 USC § 371 of International Patent Application No. PCT/US2014/019051 filed on Feb. 27, 2014, and claims priority under 35 USC § 119(e) to U.S. Provisional Patent Application Ser. No. 61/824,820 filed on May 17, 2013.

FIELD OF THE DISCLOSURE

The present disclosure relates generally to gas turbine engines and, more particularly, to airfoils of gas turbine engines.

BACKGROUND OF THE DISCLOSURE

Gas turbine engines may typically include a compressor, a combustor, and a turbine, with an annular flow path extending axially through each. Initially, air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate.

Typically, compressors of gas turbine engines include a plurality of stages. Each stage generally includes a disk with airfoils radially extending therefrom. The airfoils may be either rotor blades or stator vanes. Due to the high rotational speeds of the gas turbine engine rotors, the airfoils may be subject to high tensile stress fields and vibrational modes. Airfoil damage, such as cracking or failure may result from high cycle fatigue caused by the induced vibratory stress cycles. In addition, modern engine design trends have incorporated higher rotor speeds, higher stage pressure ratios, and reduced axial spacing; factors which all increase the of the disturbances exciting the airfoils.

Accordingly, there exists a need for an airfoil design that can raise the resonant frequencies of the lower airfoil modes in order to produce more durable airfoils having resonant frequencies outside the level of vibratory excitations which may cause damage to the airfoil. This invention is directed to solving this need and others.

SUMMARY OF THE DISCLOSURE

According to one exemplary embodiment of the present disclosure, a root extending from a platform of an airfoil is disclosed. The root may comprise a first portion having a generally cylindrical shape, and a second portion extending from the first portion to the platform, the second portion having a circumference larger than a circumference of the first portion.

In a refinement, the second portion may increase in cross-sectional area from the first portion to the platform.

In another refinement, the second portion may have a generally conical shape.

In another refinement, the second portion may increase a frequency at which lower modes of the airfoil occur.

In another refinement, the root may further comprise a third portion between the first portion and the second portion, the third portion having a generally arcuate shape.

In another refinement, the root may further comprise a fourth portion between the platform and the second portion, the fourth portion having a generally arcuate shape.

In another refinement, the root may be shaped to fit within a groove of a disk, and the circumference of the first portion may be determined by an upper wall of the groove.

In another refinement, the root may further comprise an end portion extending from the first portion in a direction away from the platform, the end portion having a bearing surface which is in contact with a bearing surface of the groove.

In yet another refinement, the first and second portions may be aligned with a central axis of the airfoil.

According to another exemplary embodiment of the present disclosure, a gas turbine engine is disclosed. The gas turbine engine may comprise a compressor section, a combustor section downstream of the compressor section, and a turbine section downstream of the combustor section. At least one of the compressor section and the turbine section may have an airfoil including a platform, and a root extending from the platform. The root may include a cylindrical neck, and a segment gradually increasing in cross-sectional area from the cylindrical neck to the platform.

In a refinement, the segment may be generally conical in shape.

In another refinement, the root may further include a first fillet between the segment and the cylindrical neck.

In another refinement, the root may further include a second fillet between the segment and the platform.

In another refinement, the segment may increase a frequency at which lower airfoil modes occur.

In yet another refinement, the root may be positioned within a disk of the at least one of the compressor section and the turbine section.

According to yet another exemplary embodiment of the present disclosure, a method for designing an airfoil is disclosed. The method may comprise providing the airfoil with a platform and a root extending from an under side of the platform, and gradually increasing a cross-sectional area from a neck of the root to the platform in a segment between the neck and the platform.

In a refinement, the method may further comprise providing the segment with a generally conical shape.

In another refinement, the method may further comprise providing a first fillet between the segment and the neck.

In another refinement, the method may further comprise providing a second fillet between the segment and the platform.

In yet another refinement, the method may further comprise increasing a frequency at which lower airfoil modes occur through a shape of the segment.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION

Figure 1:
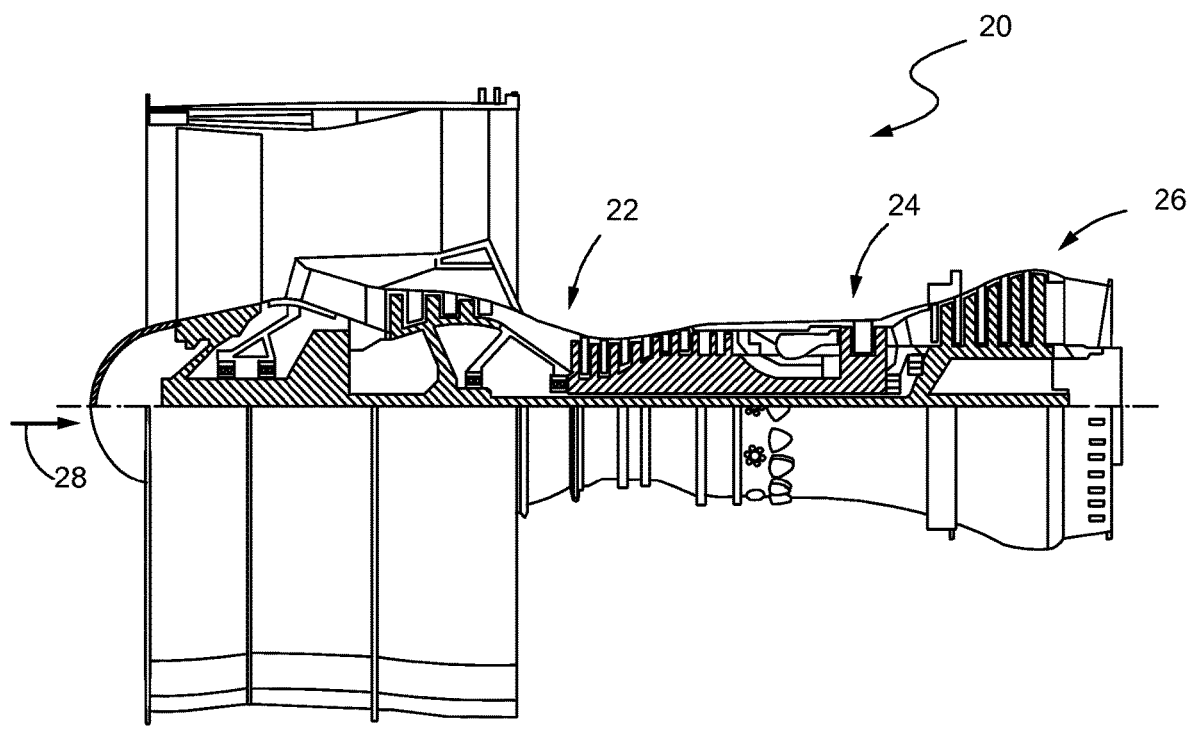
FIG. 1 is a cross-sectional view of a gas turbine engine constructed in accordance with the present disclosure.

Referring now to the drawings, and with specific reference to FIG. 1, in accordance with the teachings of the disclosure, an exemplary gas turbine engine 20 is shown. The gas turbine engine 20 may generally comprise a compressor section 22 where air is pressurized, a combustor section 24 downstream of the compressor section which mixes and ignites the compressed air with fuel and thereby generates hot combustion gases, a turbine section 26 downstream of the combustor 24 for extracting power from the hot combustion gases, and an annular flow path 28 extending axially through each. The gas turbine engine 20 may be used on an aircraft for generating thrust or power, or in land-based operations for generating power as well.

Figure 2:
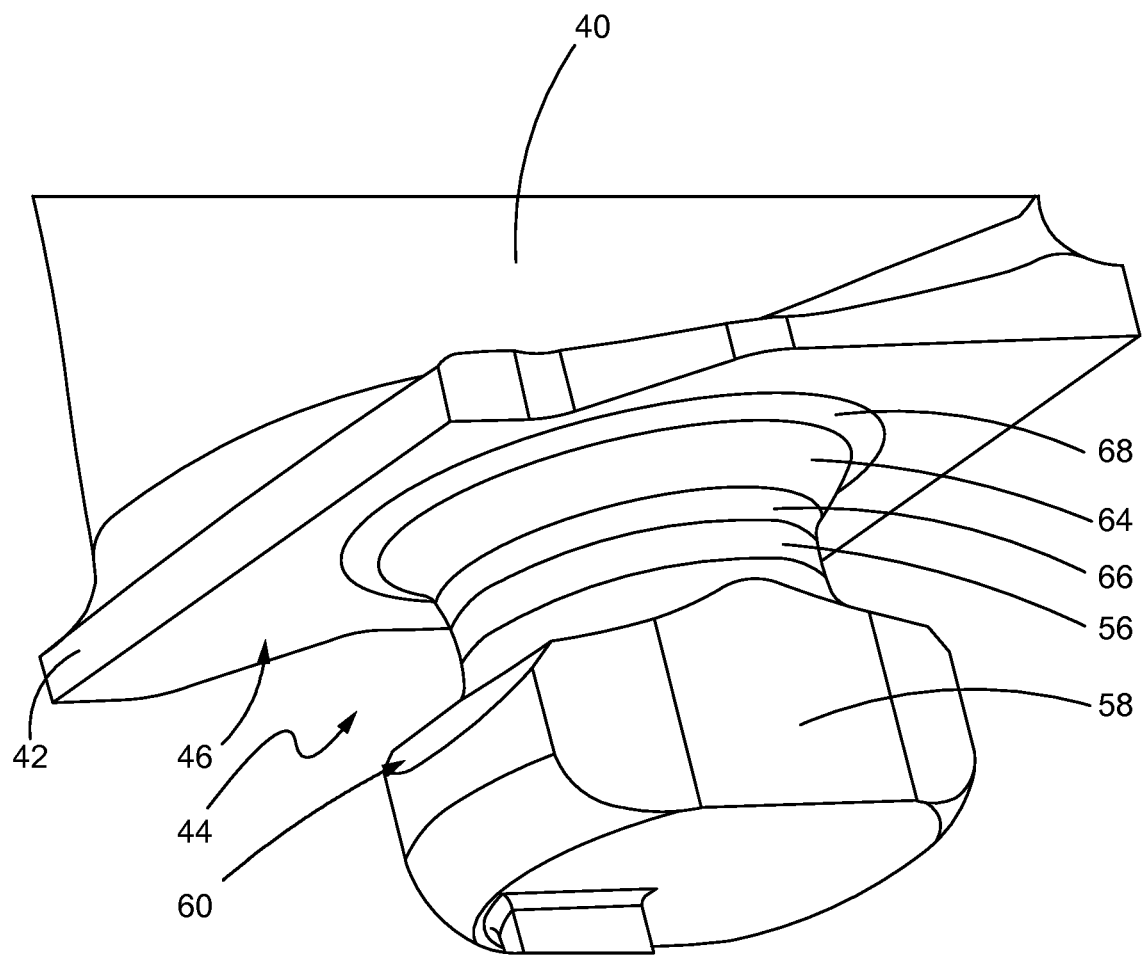
FIG. 2 is a perspective view of a portion an airfoil of the gas turbine engine of FIG. 1, according to an exemplary embodiment of the present disclosure.
Figure 3:
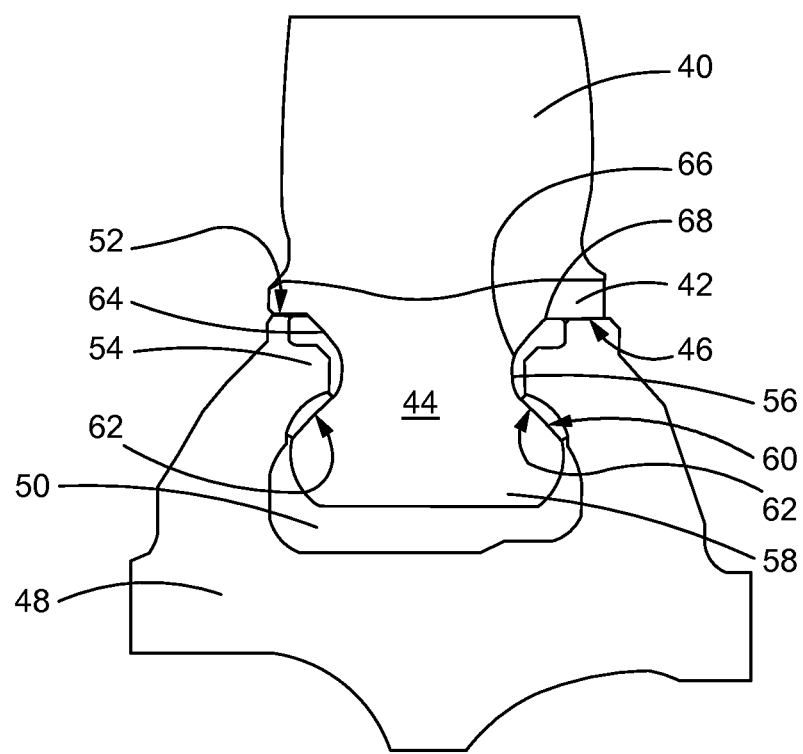
FIG. 3 is a lateral cross-sectional view of the airfoil of FIG. 2 within a disk.

Turning now to FIGS. 2 and 3, with continued reference to FIG. 1, a portion of an airfoil 40 of the gas turbine engine 20 is shown, according to an exemplary embodiment of the present disclosure. The airfoil 40 may be a rotor blade or a stator vane in the compressor section 22 or turbine section 26 of the gas turbine engine 20. The airfoil 40 may project radially from a platform 42 and may include a root 44 extending from an under side 46 of the platform 42. The airfoil 40 may be installed or positioned within a disk 48 of an airfoil stage. For example, the root 44 may be shaped to fit within a groove 50 of the disk 48, and the under side 46 of the platform 42 may rest upon an upper surface 52 of an upper wall 54 of the groove 50.

The root 44 may have a first portion or neck 56 and an end portion 58 extending from the neck 56 in a direction away from the platform 42. The neck 56 may have a generally cylindrical shape with a circumference determined by the upper wall 54 of the groove 50. The end portion 58 may have a larger cross-sectional area than the neck 56 and may have a bearing surface 60 which contacts a bearing surface 62 of the groove 50.

Between the neck 56 and the under side 46 of the platform 42, the root 44 may have a second portion or segment 64. The segment 64, neck 56, and end portion 58 may be aligned with a central axis of the airfoil 40. The segment 64 may be designed to increase a frequency at which lower modes of the airfoil 40 occur. For example, a circumference of the segment 64 may be larger than the circumference of the neck 56 with a cross-sectional area of the segment 64 gradually increasing from the neck 56 to the platform 42. The segment 64 may have a generally conical shape, although other shapes are certainly possible. By increasing the cross-sectional area of the segment 64 between the neck 56 and the platform 42, a stiffness of the airfoil 40 on the under side 46 of the platform 42 is increased, thereby changing a resonant frequency of the airfoil 40. In so doing, the resonant frequency at which lower modes of the airfoil 40 occur may be raised to a level outside of which vibratory excitations during engine operation may cause damage to the airfoil 40.

In addition, the root 44 of the airfoil 40 may have a third portion 66 between the neck 56 and the segment 64. The root 44 may also have a fourth portion 68 between the platform 42 and the segment 64. The third and fourth portions 66, 68 may have a generally curved or arcuate shape, such as a fillet. The third and fourth portions 66, 68 may provide a smooth transitional surface from the neck 56 to the segment 64 and from the segment 64 to the platform 42.

Figure 4:
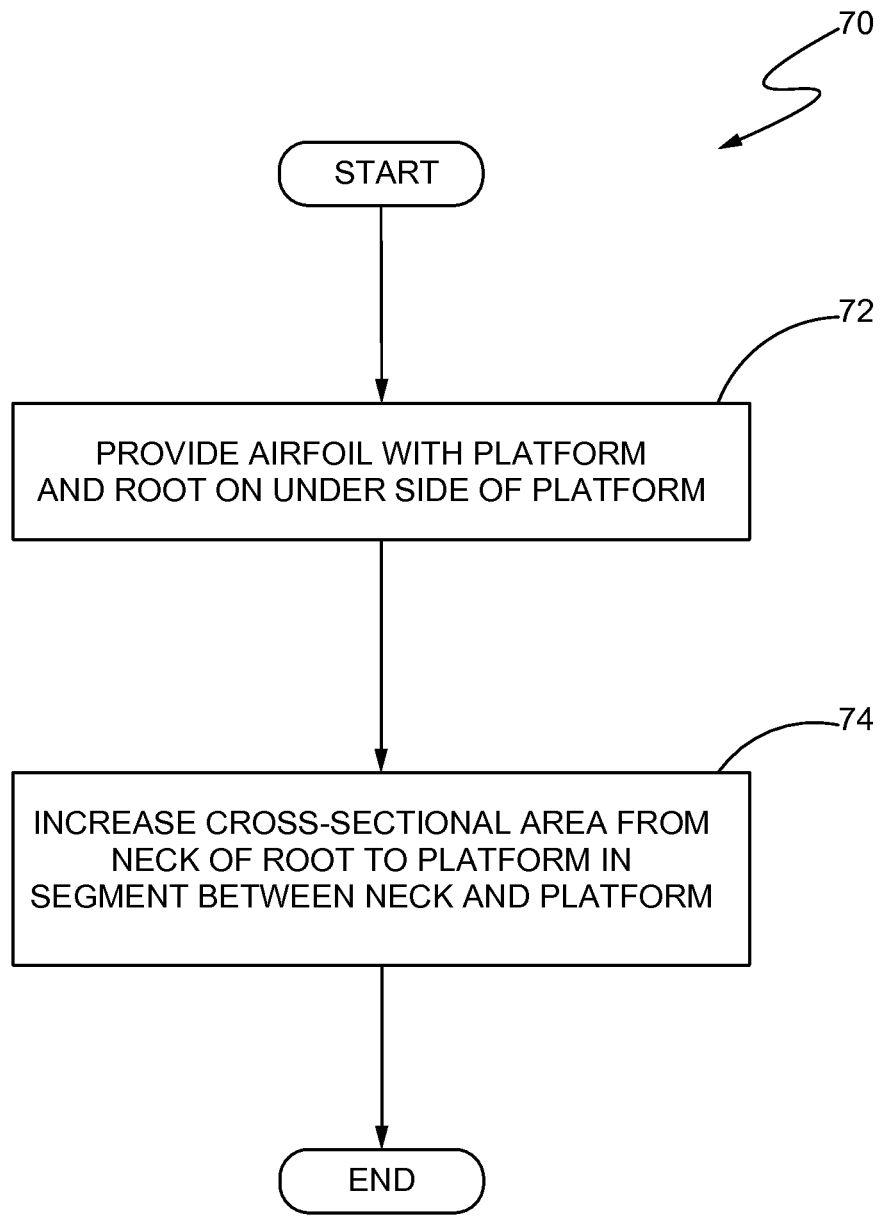
FIG. 4 is a flowchart outlining a method for designing an airfoil, according to another exemplary embodiment of the present disclosure.

Referring now to FIG. 4, with continued reference to FIG. 1-3, a flowchart outlining a method 70 for designing an airfoil is shown, according to another exemplary embodiment of the present disclosure. At a first step 72 of the method 70, the airfoil 40 may be provided with the platform 42 and the root 44 extending from the under side 46 of the platform 42. At a next step 74, the cross-sectional area from the neck 56 of the root 44 to the platform 42 may be gradually increased in the segment 64 between the neck 56 and the platform 42. In so doing, the frequency at which lower airfoil modes occur may be increased through a shape of the segment 64.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The present disclosure provides a specialized design for an airfoil root extending from the under side of the airfoil platform and positioned with the disk. By increasing the cross-sectional area of the root from its neck to the platform, the stiffness of the airfoil 40 is increased, thereby increasing the resonant frequency of the airfoil. In so doing, the resonant frequency at which lower modes of the airfoil occur is changed to a level outside of which vibratory excitations during engine operation may cause damage to the airfoil. As a result, a more durable airfoil is provided having greater resistance to high cycle fatigue caused by the induced vibratory stress cycles and thereby extending the life of the airfoil, as well as the engine, and reducing overall maintenance costs.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed, but rather includes all embodiments and equivalents encompassed within the claims appended hereto as well.

What is claimed is:

1. An airfoil of a gas turbine engine having a platform and a root extending from the platform, the root comprising:

a first portion having a generally cylindrical shape;

a second portion extending from the first portion to the platform, the second portion having a circumference larger than a circumference of the first portion;

a fillet between the first portion and the second portion; and an end portion having a circumference larger than the circumference of the first portion and extending from the first portion in a direction away from the platform, the end portion having a bearing surface which is in contact with a bearing surface of a groove of a disk, wherein the first portion, the second portion, and the end portion are formed as one piece with the platform and the airfoil.

2. The airfoil of claim 1, wherein the second portion increases in cross-sectional area from the first portion to the platform.

3. The airfoil of claim 1, wherein the second portion has a generally conical shape.

4. The airfoil of claim 1, wherein the second portion increases a frequency at which lower modes of the airfoil occur.

5. The airfoil of claim 1, further comprising a third portion between the first portion and the second portion, the third portion having a generally arcuate shape.

6. The airfoil of claim 1, further comprising a fourth portion between the platform and the second portion, the fourth portion having a generally arcuate shape.

7. The airfoil of claim 1, wherein the root is shaped to fit within a groove of a disk, and wherein the circumference of the first portion is determined by an upper wall of the groove.

8. The airfoil of claim 1, wherein the first portion and the second portion are aligned with a central axis of the airfoil.

9. A gas turbine engine, comprising:
a compressor section;
a combustor section downstream of the compressor section;
and a turbine section downstream of the combustor section, at least one of the compressor section and the turbine section having an airfoil including a platform, and a root extending from the platform, the root including a cylindrical neck;
a segment gradually increasing in cross-sectional area from the cylindrical neck to the platform;
a first fillet between the segment and the cylindrical neck; and
an end portion having a circumference larger than a circumference of the cylindrical neck and extending from the cylindrical neck in a direction away from the platform, the end portion having a bearing surface which is in contact with a bearing surface of a groove of a disk, wherein the cylindrical neck, the segment, and the end portion are formed as one piece with the platform and the airfoil.

10. The gas turbine engine of claim 9, wherein the segment is generally conical in shape.

11. The gas turbine engine of claim 9, wherein the root further includes a second fillet between the segment and the platform.

12. The gas turbine engine of claim 9, wherein the segment increases a frequency at which lower airfoil modes occur.

13. The gas turbine engine of claim 9, wherein the root is positioned within a disk of the at least one of the compressor section and the turbine section.

14. A method for designing an airfoil, comprising:
providing the airfoil with a platform and a root extending from an under side of the platform;
gradually increasing a cross-sectional area from a cylindrical neck of the root to the platform in a segment between the cylindrical neck and the platform;
providing a first fillet between the segment and the cylindrical neck; and
providing the root with an end portion having a circumference larger than a circumference of the cylindrical neck and extending from the cylindrical neck in a direction away from the platform, the end portion having a bearing surface which is in contact with a bearing surface of a groove of a disk, wherein the cylindrical neck, the segment, and the end portion are formed as one piece with the platform and the airfoil.

15. The method of claim 14, further comprising providing the segment with a generally conical shape.

16. The method of claim 14, further comprising providing a second fillet between the segment and the platform.

17. The method of claim 14, further comprising increasing a frequency at which lower airfoil modes occur through a shape of the segment.

* * * * *